(12) United States Patent
Ponsini

(10) Patent No.: US 9,331,988 B2
(45) Date of Patent: May 3, 2016

(54) SYSTEM AND METHOD FOR PROVISIONING SECRETS TO AN APPLICATION (TA) ON A DEVICE

(71) Applicant: Oracle International Corporation, Redwood Shores, CA (US)

(72) Inventor: Nicolas Ponsini, Mougins (FR)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/221,022

(22) Filed: Mar. 20, 2014

(65) Prior Publication Data

US 2015/0271160 A1 Sep. 24, 2015

(51) Int. Cl.
*H04L 9/08* (2006.01)
*H04L 9/32* (2006.01)
*H04L 29/06* (2006.01)
*H04W 12/04* (2009.01)

(52) U.S. Cl.
CPC ............ *H04L 63/061* (2013.01); *H04L 9/3263* (2013.01); *H04L 63/0464* (2013.01); *H04L 63/0471* (2013.01); *H04L 63/0869* (2013.01); *H04W 12/04* (2013.01); *H04L 2463/061* (2013.01); *H04L 2463/062* (2013.01)

(58) Field of Classification Search
CPC ....... H04L 9/08; H04L 9/0822; H04L 9/3236; H04L 9/0861
USPC .............. 713/168, 171, 183, 185; 380/30, 44, 380/277
See application file for complete search history.

(56) References Cited

U.S. PATENT DOCUMENTS

| 8,010,810 | B1 * | 8/2011 | Fitzgerald et al. ............. 713/193 |
| 8,266,433 | B1 * | 9/2012 | Przykucki ............... H04L 63/06 380/286 |
| 8,572,410 | B1 | 10/2013 | Tkacik |
| 2003/0194085 | A1 * | 10/2003 | Dillaway ............ G06F 21/6209 380/29 |
| 2005/0144468 | A1 * | 6/2005 | Northcutt et al. ............. 713/189 |
| 2009/0323940 | A1 * | 12/2009 | Moffat et al. ................... 380/44 |
| 2010/0291904 | A1 | 11/2010 | Musfeldt et al. |
| 2012/0102334 | A1 * | 4/2012 | O'Loughlin et al. ......... 713/189 |
| 2013/0152180 | A1 | 6/2013 | Nair et al. |
| 2014/0245013 | A1 | 8/2014 | Kim et al. |
| 2015/0188944 | A1 | 7/2015 | Dyer |

OTHER PUBLICATIONS

"Key Establishment Protocols"—Purdue Univ, Oct. 2005 https://www.cs.purdue.edu/homes/ninghui/courses/Fall05/lectures/355_Fall05_lect34.pdf.*
OMTP (Advanced Trusted Environment: OMTP TR1, May 28, 2009, 204 pages.
ARM (Building a Secure System using TrustZone® Technology, PRD29-GENC-009492C, Apr. 2009, 108 pages).

(Continued)

*Primary Examiner* — Randy Scott
(74) *Attorney, Agent, or Firm* — Tucker Ellis LLP

(57) ABSTRACT

A system and method can support device management. An authorization entity can pass one or more secrets that are wrapped with a first key to a communication entity. Furthermore, the communication entity can use a second key to establish a secure channel with an application on a device, and pass the one or more secrets that are wrapped with the first key to the application on the device using the secure channel. Then, the device can use the first key to unwrap the received wrapped secret.

29 Claims, 5 Drawing Sheets

(56) References Cited

OTHER PUBLICATIONS

Turan et al., NIST Special Publication 800-132, Dec. 2010, 18 pages.

European Patent Office, International Searching Authority, International Search Report and Written Opinion dated Apr. 30, 2015 for International Application No. PCT/US2014/072843, 10 pages.

* cited by examiner

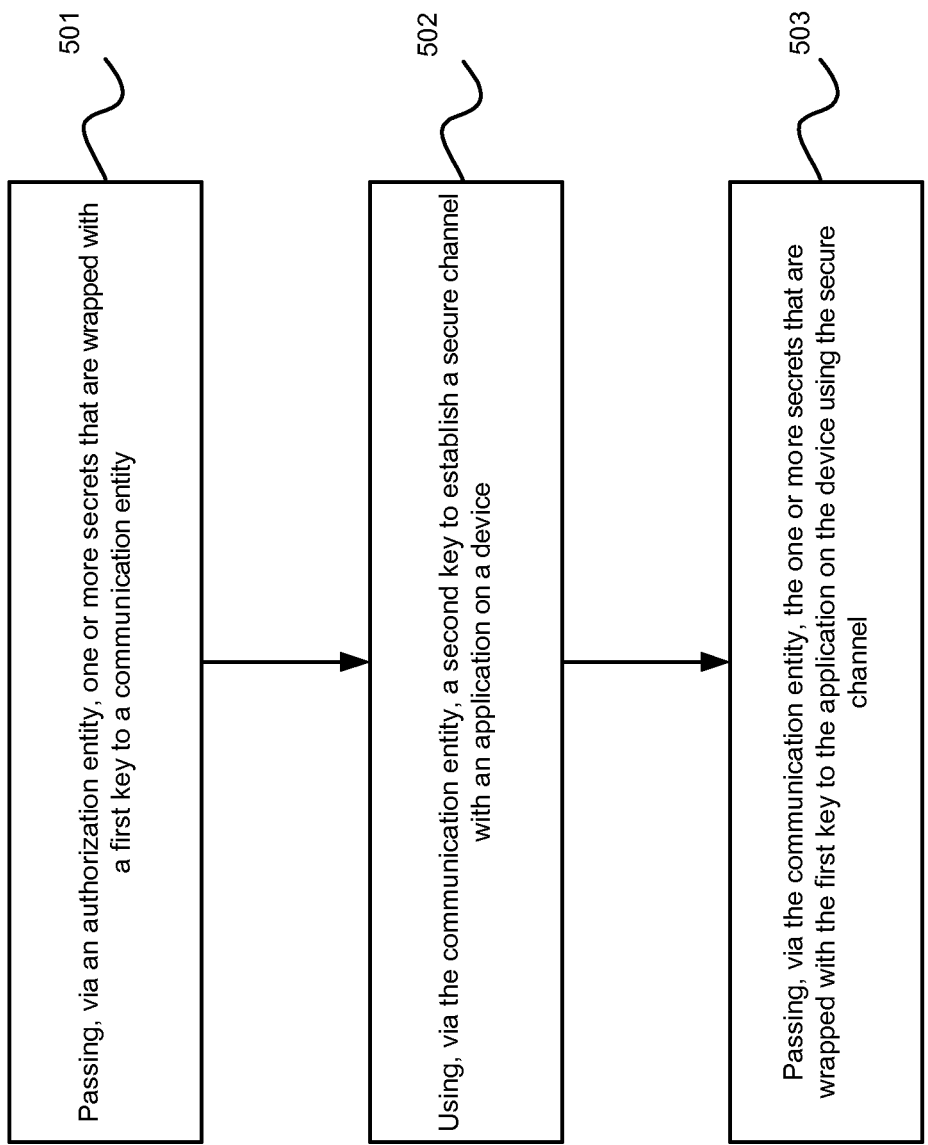

US 9,331,988 B2

SYSTEM AND METHOD FOR PROVISIONING SECRETS TO AN APPLICATION (TA) ON A DEVICE

CROSS REFERENCE TO RELATED APPLICATIONS

This application is related to the following patent application(s), each of which is hereby incorporated by reference in its entirety:

U.S. Patent Application titled "SYSTEM AND METHOD FOR SUPPORTING DERIVING SECRETS FROM A MASTER KEY BOUND TO AN APPLICATION ON A DEVICE", application Ser. No. 14/220,988, filed Mar. 20, 2014; and U.S. Patent Application titled "SYSTEM AND METHOD FOR UPDATING TRUSTED APPLICATION (TA) ON A DEVICE", application Ser. No. 14/221,004, filed Mar. 20, 2014.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to device management and security.

BACKGROUND

In the post personal computer (PC) era, businesses often permit employees to bring various mobile devices, such as smart phones, tablets, and laptops, to their workplace. The employees can use those personally owned devices to access privileged company information and applications. The information technology industry has been evolving to promote the secure and interoperable deployment and management of software applications using secure chip technology, e.g. based on the GlobalPlatform. This is the general area that embodiments of the invention are intended to address.

SUMMARY

Described herein are systems and methods that can support device management. An authorization entity can pass one or more secrets that are wrapped with a first key to a communication entity. Furthermore, the communication entity can use a second key to establish a secure channel with an application on a device, and pass the one or more secrets that are wrapped with the first key to the application on the device using the secure channel. Then, the device can use the first key to unwrap the received wrapped secret.

BRIEF DESCRIPTION OF THE FIGURES

FIG. 5 illustrates an exemplary flow chart for provisioning secrets to an application on a device, in accordance with an embodiment of the invention.

DETAILED DESCRIPTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

Described herein are systems and methods that can support device management.

Exemplary Device Architecture

In accordance with an embodiment, the systems and methods described herein can be implemented as, or used with a device, such as a mobile device (e.g., smart phone), or other device In accordance with various embodiments, the device can be based on a system-on-chip (SoC) architecture. The description of embodiments of the invention provided herein generally uses the ARM SoC architecture as one example of a SoC architecture. It will be apparent to those skilled in the art that, in accordance with various embodiments, other types of SoC architecture can be used, without limitation.

In accordance with an embodiment, an SoC architecture, which includes both hardware and software components, can provide on-chip integration of various types of functional hardware, in order to perform different tasks such as power management, computing, audio/video, graphics, global positioning system (GPS), and radio.

The hardware components in a SoC architecture can include various analog, digital, and storage components. For example, in accordance with an embodiment, the analog components can include analog-to-digital converter (ADC) and digitally controlled amplifier (DCA) components, phase-locked loop (PLL) components, transmitting (Tx)/receiving (Rx) components, radio frequency (RF) components. The digital components can include various processors, interfaces, and accelerators. The storage components can include static random-access memory (SRAM), dynamic random-access memory (DRAM), non-volatile storage components such as flash memory, and read-only memory (ROM). Additionally, the SoC can contain programmable hardware, such as field-programmable gate array (FPGA), mixed signal blocks, and sensors.

In accordance with an embodiment, a SoC architecture can include both on-chip and off-chip software components. For example, the software components in a SoC architecture can include a real-time operation system (RTOS), device drivers, and software applications.

Additionally, in accordance with an embodiment, a SoC architecture can take advantage of various portable/reusable components and/or circuit designs, embedded CPU, embedded memory, and real world interfaces such as universal serial bus (USB), peripheral component Interconnect (PCI), and Ethernet.

Figure 1:
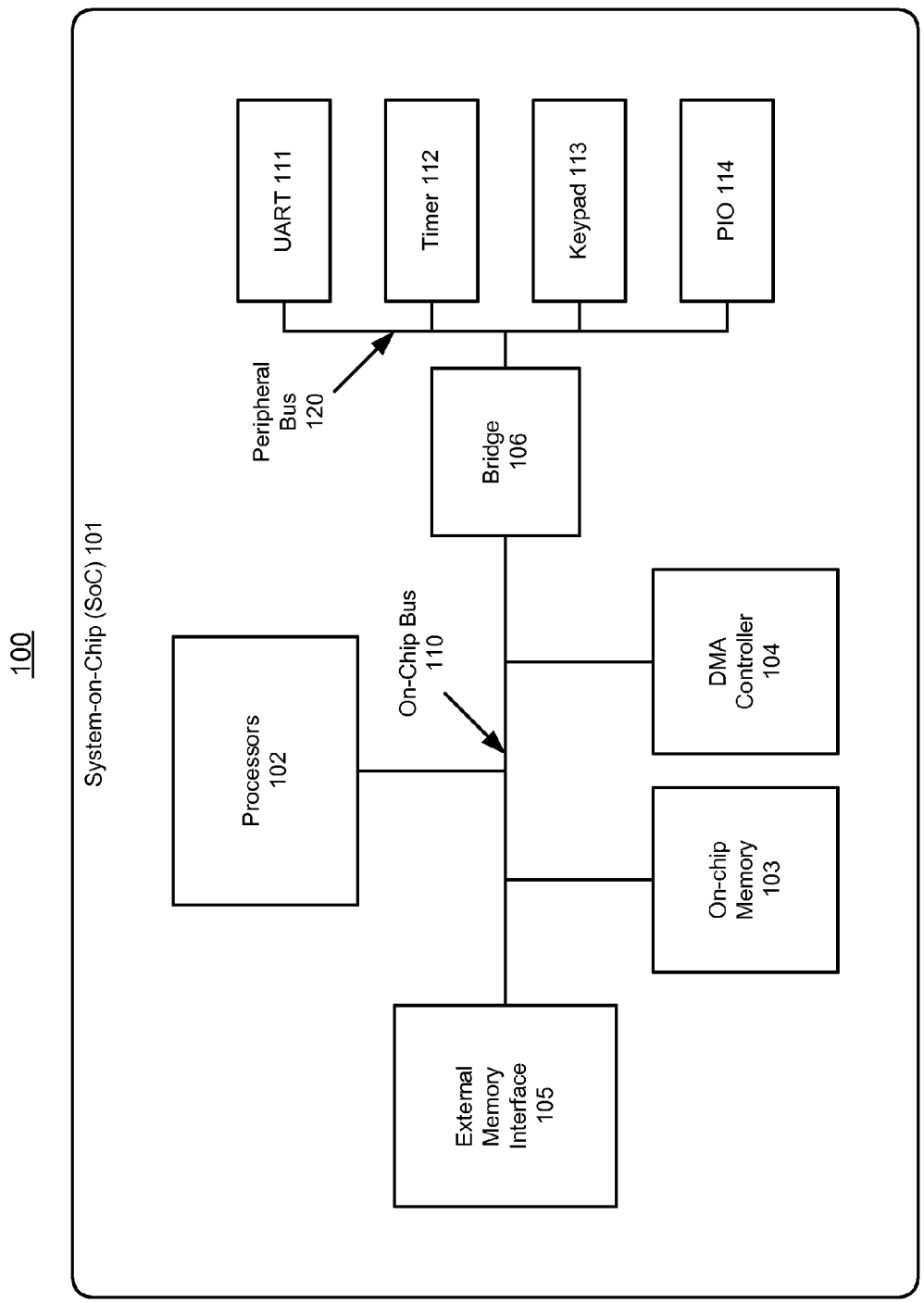
FIG. 1 shows an illustration of an exemplary system-on-chip (SoC) architecture on a device.

FIG. 1 shows an illustration of an exemplary system-on-chip (SoC) architecture on a device in accordance with an embodiment. As shown in FIG. 1, a SoC 101 for a device 100 can include a high performance on-chip bus 110, which interconnects one or more processors 102, an on-chip random-access memory (RAM) 103, a direct memory access (DMA) controller 104, and one or more external memory interfaces 105.

In accordance with an embodiment, the processors 102 in the SoC 101 can include a single-core or multiple-core central processing unit (CPU), a cache component, a graphics processing unit (GPU), a video codec, and a liquid-crystal display (LCD) video interface.

Also, in accordance with an embodiment, the SoC 101 can include a bridge 106 that connects the high performance on-chip bus 110 to a peripheral bus 120, which can be run with a lower bandwidth, using lower power, latched address and control, and simple interface. For example, as shown in FIG. 1, the peripheral bus 120 can provide access to a universal asynchronous receiver/transmitter (UART) 111, a timer 112, a keypad interface 113, and programmed input/output (PIO) interfaces 114.

In accordance with an embodiment, the SoC 101 for the device 100 can establish mobile connectivity using different technologies, such as Bluetooth, Wi-Fi, cellular (3G/4G/LTE/LTE-A) modem, and/or GPS.

The exemplary SoC architecture shown in FIG. 1 is provided for purposes of illustration. In accordance with various embodiments, other types of SoC architecture can be used.

Trusted Execution Environment (TEE)

Figure 2:
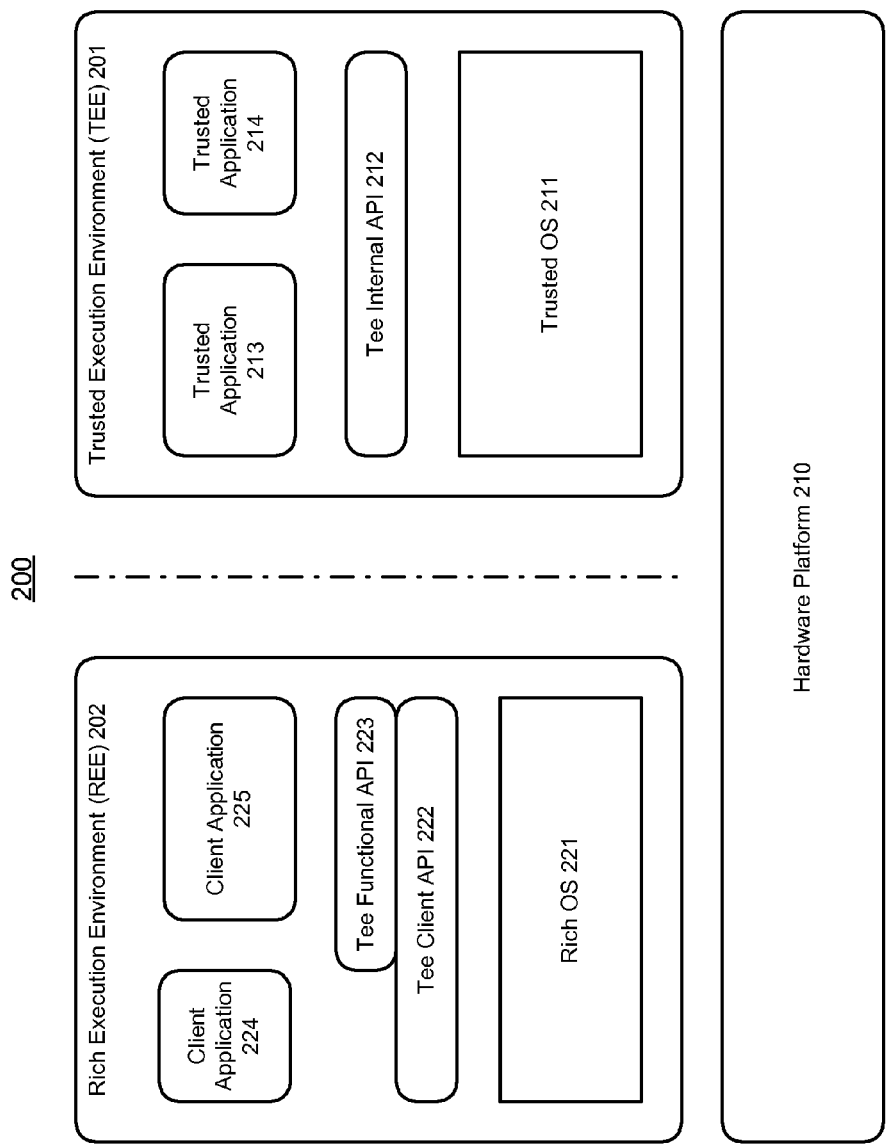
FIG. 2 shows an illustration of supporting a trusted execution environment (TEE) in a system-on-chip (SoC) architecture.

FIG. 2 shows an illustration of supporting a trusted execution environment (TEE) in a system-on-chip (SoC) architecture. As shown in FIG. 2, a SoC 200 architecture enables a device to execute code and to manipulate data in separate execution environments, e.g. a trusted execution environment (TEE) 201 and a rich execution environment (REE) 202.

The REE 202 can include the normal runtime environment based on a rich OS 221 (or the main OS such as Android or iOS), while the TEE 20, which is a secure area isolated from the REE 202, can include the secure runtime environment based on a secure OS (e.g. a trusted OS 211).

As shown in FIG. 2, both the TEE 201 and the REE 202 can run on top of a hardware platform 210. For example, an ARM SoC can provide a hardware mechanism based on the TrustZone technology and its related monitor code. Furthermore, the hardware mechanism 210 can enforce the isolation between the secure runtime environment in TEE 201 (i.e. "the secure world") and the normal runtime environment in REE 202 (i.e. "the normal world"). Also, the hardware mechanism 210 enables the communication between the two worlds.

Alternatively, both the TEE 201 and the REE 202 can be run on top of a hypervisor, instead of running directly on top of the hardware mechanism 210. For example, the hypervisor can host two virtual machines (VMs) with one VM dedicated to host the REE 202 and another VM dedicated to host the TEE 201. Here, in order to support the isolated secure execution, the VM that hosts the TEE 201 can be assigned with higher privileges over the VM that hosts the REE 202.

Furthermore, the SoC 200 can provide a root of trust that is bound to a secure boot mechanism (e.g. based on a boot ROM). The root of trust on a SoC 200 guarantees that the code in a TEE 201 is genuine and that only authorized code can be executed in the TEE 201.

As shown in FIG. 2, the TEE 201 environment allows one or more trusted application (TAs) 213-214 to run on top of the trusted OS 211, e.g. via a TEE internal application programming interface (API) 212. The trusted OS 211 can leverage the security features present on the SoC 200 and can execute the TAs 213-214 in the TEE 201 in a secure fashion.

The TAs 213-214 may need to be signed by an authority, such as an installation authority, before being installed within the TEE 201. Depending on business models and business agreements, the installation authority can be the owner of the device hosting the SoC 200, the OEM or a third party.

Once the TAs 213-214 are installed within the TEE 201, the TAs 213-214 can be stored in a secure file system (SFS), which is managed by the TEE 201. Furthermore, the TA 213-214 can be accessed from the SFS, each time when the TA 213-214 is required. Thus, the TEE 201 can provide secure storage for the TAs 213-214, since the SFS guarantees confidentiality and integrity of the data stored in it.

Also as shown in FIG. 2, the TEE 201 can expose a set of interfaces, such as the TEE client API 222 and the TEE functional API 223, in the REE 202, in order to provide security services to various client applications 224-225 in the REE 202. Additionally, the TEE 201 allows the client applications 224-225 in the REE 202 and the trusted applications 213-214 to use a shared memory for communicating large amounts of data, quickly and efficiently.

Key Sharing at the Manufacturing Time

Figure 3:
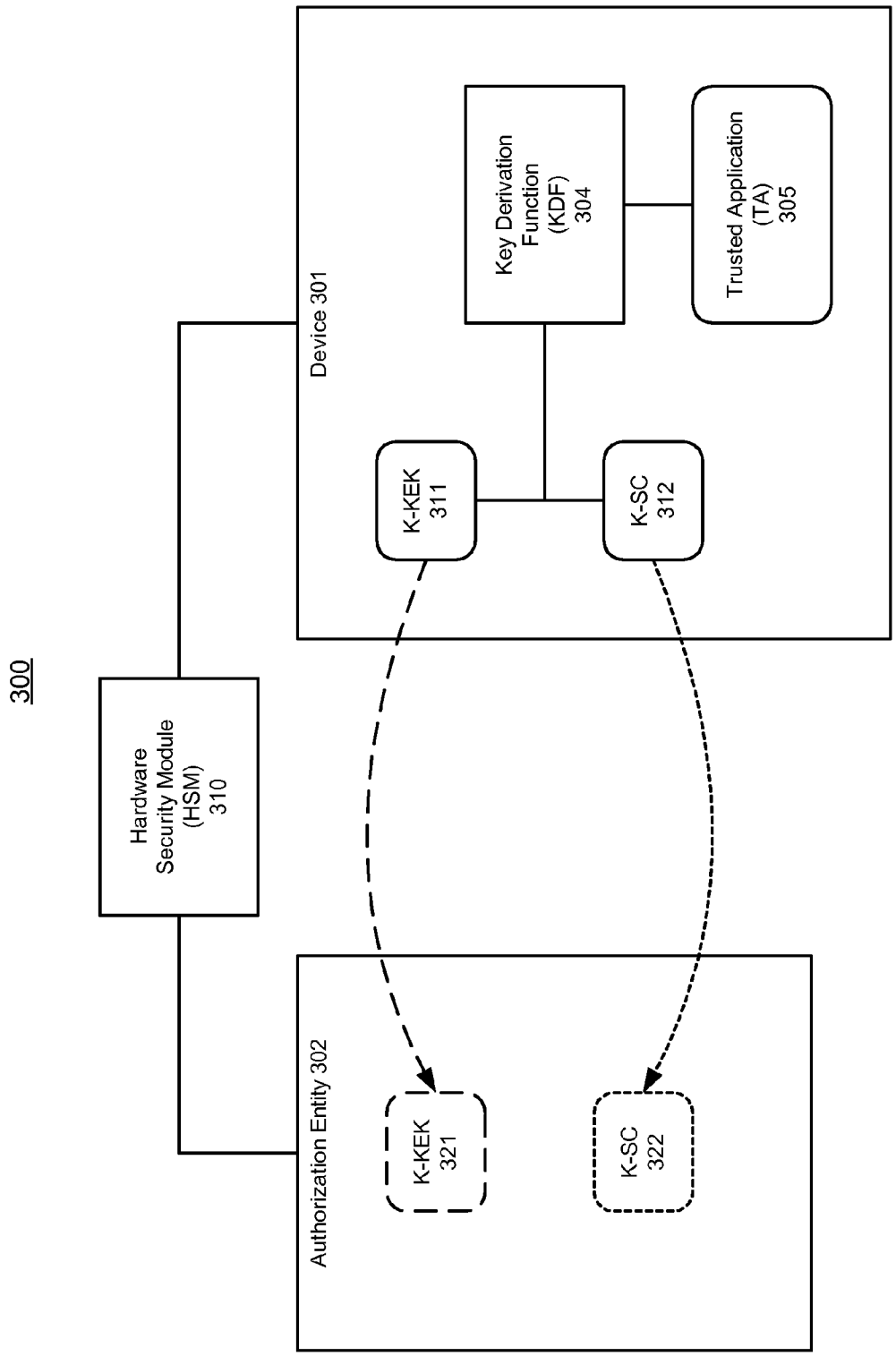
FIG. 3 shows an illustration of supporting key sharing at the manufacturing time, in accordance with an embodiment of the invention.

FIG. 3 shows an illustration of supporting key sharing at the manufacturing time, in accordance with an embodiment of the invention. As shown in FIG. 3, at the manufacturing time 300, a device 301 such as a smart phone or a tablet, which may host a system-on-chip (SoC), can use a key derivation function (KDF) 304 to derive different keys, e.g. K-KEK 311 and K-SC 312, bound to a trusted application (TA) 305.

Furthermore, the keys 311-312, which are generated on the device 301, can be passed to an authorization entity 302 (as the K-KEK 321 and the K-SC 322), via a hardware security module (HSM) 310. Thus, the device 301 can share the keys 311-312 with the authorization entity 302 in a secure manner, at the manufacturing time.

Provisioning Secrets to an Application on a Device

Figure 4:
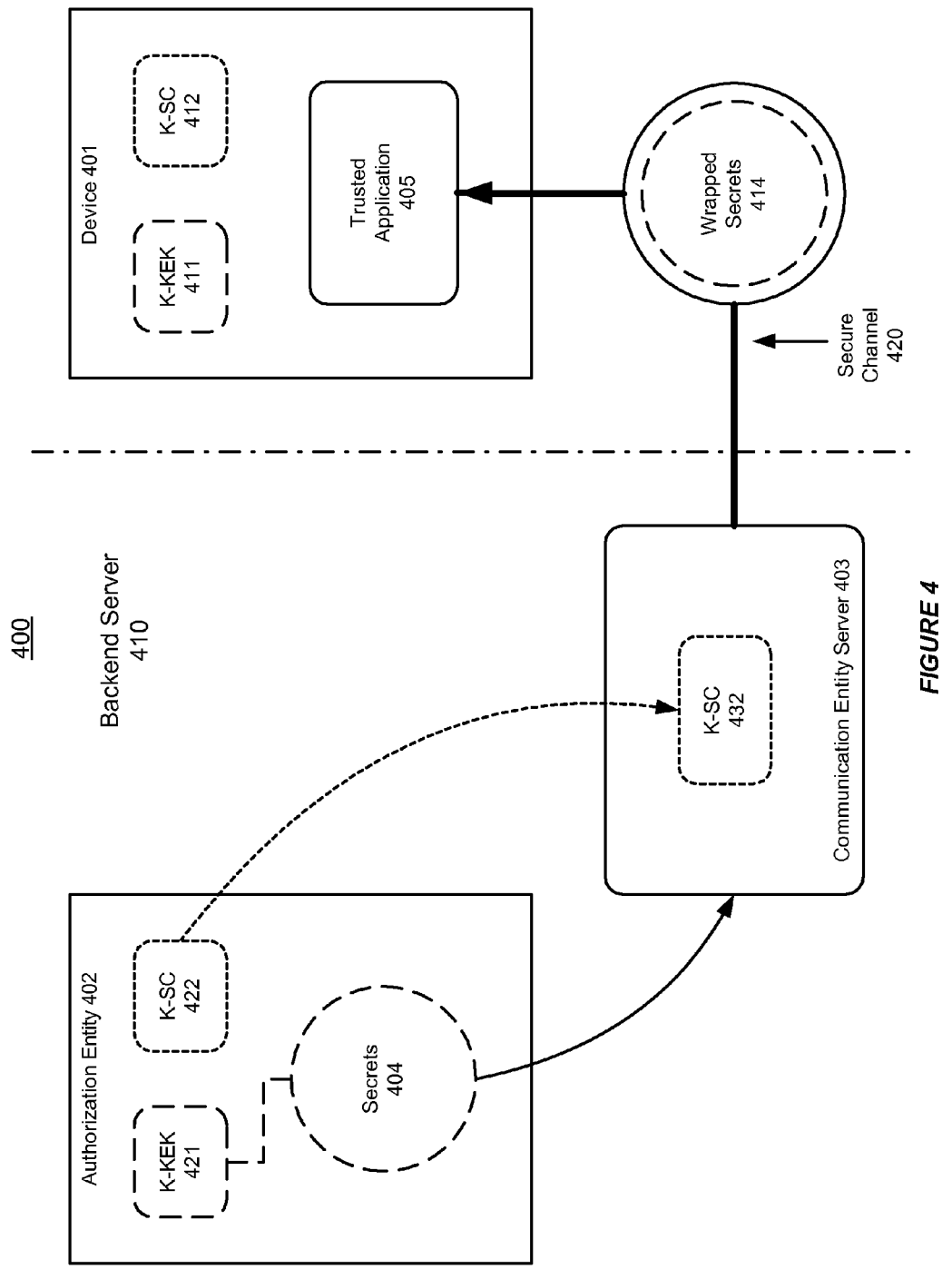
FIG. 4 shows an illustration of provisioning secrets to an application on a device, in accordance with an embodiment of the invention.

FIG. 4 shows an illustration of provisioning secrets to an application on a device, in accordance with an embodiment of the invention. As shown in FIG. 4, after the device 401 is deployed in the field, an authorization entity 402 on a backend server 410 can use a communication entity 403 for provisioning one or more secrets 404 to an application, such as a trusted application 405, on the device 401.

Furthermore, the device 401 can have access to different device keys, e.g. the K-KEK 411 and the K-SC 412, which are intrinsic to the device 401 and/or application 405. Additionally, during the manufacturing time, the device 401 can share the device keys, K-KEK 411 and K-SC 412, with an authorization entity 402 in a secure manner (as the K-KEK 421 and the K-SC 422).

As shown in FIG. 4, the authorization entity 402 can wrap one or more secrets 404 using a shared device key, e.g. the K-KEK 421, before passing the wrapped secret 414 to the communication entity 403. Additionally, the authorization entity 402 can pass another device key, e.g. the K-SC 422, to the communication entity 403 (as the K-SC 432).

Then, the communication entity 403, such as a trusted server manager (TSM), can use the received K-SC 432 (i.e. same as the K-SC 412 on the device 401) to establish a secure channel 420 with the trusted application 405 on the device 401.

Furthermore, the communication entity 403 can pass the wrapped secrets 414 (i.e. the secrets 404 wrapped using K-KEK 421) to the trusted application 405 on the device 401 via the secure channel 420. Correspondingly, the device 401 can use the K-KEK 411, which is generated at the manufacturing time, to unwrap the wrapped secrets 414 in order to obtain the secrets 404.

In accordance with an embodiment of the invention, the system can establish an inherent binding, which may not rely on persistent data, between the authorization entity 402 server and the device 401, for provisioning the secrets 404 to the application 405 on the device 401 in the field. Additionally, the authorization entity 402 can use the communication entity 403, which can be a third party entity, to communicate secrets 404 to the device 401, without having to divulge the secrets 404 that may need to be provisioned.

Thus, the system permits the authorization entity 402 to deal with the secrets 404, without a need for dealing with the communication with the device 401. As a result, using the system, a business can achieve shorted time to market by not having to concern about communication features.

FIG. 5 illustrates an exemplary flow chart for provisioning secrets to an application on a device, in accordance with an embodiment of the invention. As shown in FIG. 5, at step 501, an authorization entity in a backend server can pass one or more secrets that are wrapped with a first key to a communication entity. Then, at step 502, the communication entity can use a second key to establish a secure channel with an application on a device. Furthermore, at step 503, the communication entity can pass the one or more secrets that are wrapped with the first key to the application on the device using the secure channel.

Many features of the present invention can be performed in, using, or with the assistance of hardware, software, firmware, or combinations thereof. Consequently, features of the present invention may be implemented using a processing system (e.g., including one or more processors).

Features of the present invention can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present invention can be incorporated in software and/or firmware for controlling the hardware of a processing system, and for enabling a processing system to interact with other mechanism utilizing the results of the present invention. Such software or firmware may include, but is not limited to, application code, device drivers, operating systems and execution environments/containers.

Features of the invention may also be implemented in hardware using, for example, hardware components such as application specific integrated circuits (ASICs). Implementation of the hardware state machine so as to perform the functions described herein will be apparent to persons skilled in the relevant art.

Additionally, the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for supporting device management, the method comprising:
sharing first and second keys which are associated with a device, with an authorization entity;
wrapping, by the authorization entity, using the first key, one or more secrets to be communicated to the device, for use with an application on the device;
passing, via the authorization entity, the one or more secrets that are wrapped with the first key, together with the second key, to a communication entity;
using, via the communication entity, the second key to establish a secure channel between the communication entity and the application on the device; and
passing, via the communication entity using the secure channel, the one or more secrets that are wrapped with the first key, to the application on the device, wherein the device uses the first key to unwrap and obtain the one or more secrets.

2. The method of claim 1, further comprising:
allowing the device to use the first key to unwrap the received one or more secrets that are wrapped with the first key.

3. The method of claim 1, further comprising:
allowing the communication entity to be a trusted server manager (TSM) that is capable of establishing the secure channel with the device.

4. The method of claim 1, further comprising:
using a key derivation function (KDF) associated with a trusted application (TA) on the device to derive the first key and the second key at a manufacturing time of the device.

5. The method of claim 4, further comprising:
using a hardware security module (HSM) to ensure the first key and the second key are securely passed from the device to the authorization entity.

6. The method of claim 5, further comprising:
passing, via the authorization entity, the second key to the communication entity.

7. The method of claim 1, further comprising:
establishing an inherent binding between the authorization entity and the device without relying on persistent data.

8. The method of claim 1, further comprising:
including the authorization entity and the communication entity in a backend server environment.

9. The method of claim 1, further comprising:
providing a system-on-chip in the device, wherein the system-on-chip supports the trusted execution environment.

10. The method of claim 1, further comprising:
providing a root of trust that guarantees the trusted OS to be a only component that is able to derive secrets on the system-on-chip.

11. A system for supporting device management, the system comprising:
one or more microprocessors;
an authorization entity, running on the one or more microprocessors, wherein the authorization entity operates to share first and second keys associated with a device, wrap one or more secrets using the first key, and pass the one or more secrets that are wrapped with the first key, together with the second key, to a communication entity; and the communication entity operates to:
use the second key to establish a secure channel between the communication entity and an application on the device; and
pass via the communication entity using the secure channel the one or more secrets that are wrapped with the first key, to the application on the device, wherein the device uses the first key to unwrap and obtain the one or more secrets.

12. The system of claim 11, wherein:
the device operates to use the first key to unwrap the received one or more secrets that are wrapped with the first key.

13. The system of claim 11, wherein:
the communication entity is a trusted server manager (TSM) that is capable of establishing the secure channel with the device.

14. The system of claim 11, wherein:
the device operates to use a key derivation function (KDF) associated with a trusted application (TA) on the device to derive the first key and the second key at a manufacturing time of the device.

15. The system of claim 14, wherein:
a hardware security module (HSM) is used to ensure the first key and the second key are securely passed from the device to the authorization entity.

16. The system of claim 15, wherein:
the authorization entity operates to pass the second key to the communication entity.

17. The system of claim 11, wherein:
an inherent binding is established between the authorization entity and the device without relying on persistent data.

18. The system of claim 11, wherein:
the authorization entity and the communication entity are included in a backend server environment.

19. The system of claim 11, wherein:
a system-on-chip is provided in the device, wherein the system-on-chip supports the trusted execution environment, and provides a root of trust, which guarantees that the trusted OS is only component that is able to derive secrets on the system-on-chip.

20. A non-transitory machine readable storage medium having instructions stored thereon that when executed cause a system to perform steps comprising:
sharing first and second keys which are associated with a device, with an authorization entity;
wrapping, by the authorization entity, using the first key, one or more secrets to be communicated to the device, for use with an application on the device;
passing, via the authorization entity, the one or more secrets that are wrapped with the first key, together with the second key, to a communication entity;
using, via the communication entity, the second key to establish a secure channel between the communication entity and the application on the device; and
passing, via the communication entity using the secure channel, the one or more secrets that are wrapped with the first key, to the application on the device, wherein the device uses the first key to unwrap and obtain the one or more secrets.

21. The non-transitory machine readable storage medium according to claim 20, further comprising:
allowing the device to use the first key to unwrap the received one or more secrets that are wrapped with the first key.

22. The non-transitory machine readable storage medium according to claim 20, further comprising:
allowing the communication entity to be a trusted server manager (TSM) that is capable of establishing the secure channel with the device.

23. The non-transitory machine readable storage medium according to claim 20, further comprising:
using a key derivation function (KDF) associated with a trusted application (TA) on the device to derive the first key and the second key at a manufacturing time of the device.

24. The non-transitory machine readable storage medium according to claim 23, further comprising:
using a hardware security module (HSM) to ensure the first key and the second key are securely passed from the device to the authorization entity.

25. The non-transitory machine readable storage medium according to claim 24, further comprising:
passing, via the authorization entity, the second key to the communication entity.

26. The non-transitory machine readable storage medium according to claim 20, further comprising:
establishing an inherent binding between the authorization entity and the device without relying on persistent data.

27. The non-transitory machine readable storage medium according to claim 20, further comprising:
including the authorization entity and the communication entity in a backend server environment.

28. The non-transitory machine readable storage medium according to claim 20, further comprising:
providing a system-on-chip in the device, wherein the system-on-chip supports the trusted execution environment.

29. The non-transitory machine readable storage medium according to claim 20, further comprising:

providing a root of trust that guarantees the trusted OS to be a only component that is able to derive secrets on the system-on-chip.

\* \* \* \* \*